United States Patent
Sadovsky et al.

(10) Patent No.: US 10,037,366 B2
(45) Date of Patent: Jul. 31, 2018

(54) END TO END VALIDATION OF DATA TRANSFORMATION ACCURACY

(71) Applicant: MICROSOFT TECHNOLOGY LICENSING, LLC, Redmond, WA (US)

(72) Inventors: Art Sadovsky, Redmond, WA (US); Rustam Lalkaka, Redmond, WA (US); Felix Deschamps, Redmond, WA (US); Jungrak Kim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 14/175,871

(22) Filed: Feb. 7, 2014

(65) Prior Publication Data
US 2015/0227595 A1    Aug. 13, 2015

(51) Int. Cl.
*G06F 17/30*   (2006.01)
*G06F 21/64*   (2013.01)

(52) U.S. Cl.
CPC .. *G06F 17/30557* (2013.01); *G06F 17/30371* (2013.01); *G06F 21/64* (2013.01)

(58) Field of Classification Search
CPC ......... G06F 17/30371; G06F 17/30557; G06F 21/64
USPC ................................ 707/602, 603, 604, 688
See application file for complete search history.

(56) References Cited

U.S. PATENT DOCUMENTS

| | | | |
|---|---|---|---|
| 5,838,832 A | | 11/1998 | Barnsley |
| 6,014,670 A | * | 1/2000 | Zamanian ......... G06F 17/30563 |
| 7,430,733 B1 | | 9/2008 | Yaari |
| 8,095,630 B1 | * | 1/2012 | Schettino ............. G06F 9/4416 370/231 |
| 8,311,772 B2 | | 11/2012 | Hoffman |
| 8,412,822 B1 | * | 4/2013 | Weinman, Jr. ........ G06F 9/5027 709/201 |
| 8,560,579 B1 | * | 10/2013 | Gross ..................... H04L 43/50 707/609 |
| 9,130,937 B1 | * | 9/2015 | Ostermann ......... H04L 63/0227 |

(Continued)

FOREIGN PATENT DOCUMENTS

EP      0965909 A2     12/1999

OTHER PUBLICATIONS

"International Search Report and Written Opinion Issued in PCT Patent Application No. PCT/US2015/014020", dated Jun. 1, 2015, 9 Pages.

(Continued)

*Primary Examiner* — Cam-Linh Nguyen

(57) ABSTRACT

Data is validated as it travels through the different nodes of a data pipeline. Instead of having to wait to validate the data when the data reaches an end of the data pipeline, each node in the pipeline may validate the data. Different methods may be used to validate the data. For example, each node may determine metadata about the received data and/or the transformed data. This metadata may be used to determine if the node is receiving the same amount of data as it usually receives, whether the data is in a same format, and the like. A timing of the data through one or more of the nodes may also be used in determining when the data is valid. When a problem is detected at any of the nodes in the pipeline, a report may be sent to one or more users.

19 Claims, 11 Drawing Sheets

(56) References Cited

U.S. PATENT DOCUMENTS

| | | | |
|---|---|---|---|
| 2003/0028896 A1* | 2/2003 | Swart | H04N 7/17318 725/127 |
| 2004/0117735 A1* | 6/2004 | Breen | G06F 17/30905 715/202 |
| 2004/0122741 A1* | 6/2004 | Sidman | G06Q 30/0601 705/26.1 |
| 2005/0192922 A1 | 9/2005 | Edlund et al. | |
| 2006/0218199 A1* | 9/2006 | Kishi | G06F 11/106 |
| 2007/0067290 A1* | 3/2007 | Makela | G06F 17/30041 |
| 2007/0234343 A1* | 10/2007 | Gouge | G06F 21/51 717/174 |
| 2008/0059609 A1* | 3/2008 | Ng | G06F 21/10 709/220 |
| 2008/0189702 A1* | 8/2008 | Morgan | H04L 41/0813 718/100 |
| 2008/0195651 A1* | 8/2008 | Rachmiel | G06F 21/604 |
| 2008/0288916 A1* | 11/2008 | Tazoe | G06F 8/34 717/105 |
| 2009/0055511 A1* | 2/2009 | Berry | G06F 9/546 709/218 |
| 2009/0274434 A1* | 11/2009 | Mei | G06K 9/00711 386/278 |
| 2010/0036861 A1 | 2/2010 | Srihari et al. | |
| 2010/0169282 A1* | 7/2010 | Atluri | G06F 17/30008 707/655 |
| 2010/0250591 A1* | 9/2010 | Morris | G06F 17/30864 707/770 |
| 2011/0208681 A1* | 8/2011 | Kuecuekyan | G06N 99/005 706/21 |
| 2011/0283270 A1* | 11/2011 | Gass | G06F 8/71 717/168 |
| 2012/0191699 A1* | 7/2012 | George | G06F 17/30486 707/718 |
| 2012/0226900 A1* | 9/2012 | Rodgers | G06F 21/10 713/150 |
| 2012/0310875 A1* | 12/2012 | Prahlad | G06F 17/30539 707/602 |
| 2013/0304889 A1* | 11/2013 | Johnsen | G06F 17/30575 709/223 |
| 2014/0068265 A1* | 3/2014 | Irwin | H04L 63/123 713/170 |
| 2014/0081923 A1* | 3/2014 | Kajmowicz | G06F 11/1435 707/687 |
| 2014/0282421 A1* | 9/2014 | Jubran | G06F 11/3664 717/126 |
| 2015/0033217 A1* | 1/2015 | Mellor | H04L 63/102 717/171 |
| 2015/0046389 A1* | 2/2015 | Dhayapule | G06F 17/30563 707/602 |

OTHER PUBLICATIONS

Eager, Robert J., "Application of Network Control Systems for Adaptive Optics", In Proceedings of International Society for Optics and Photonics of SPIE Defense and Security Symposium, Apr. 2008, 12 Pages.

Garcia, et al., "Reference Software Implementation for Gifts Ground Data Processing", In Proceedings of International Society for Optics and Photonics of SPIE Optics+ Photonics, Aug. 2006, 12 Pages.

Grou-Szabo, et al., "Component-Based Methodology for Hardware Design of a Dataflow Processing Network", In Proceedings of Fifth International Workshop on System-on-Chip for Real-Time Applications, Jul. 2005, pp. 289-294.

Zhang, et al., "A Secure and Scalable Telemonitoring System Using Ultra-low-energy Wireless Sensor Interface for Long-Term Monitoring in Life Science Applications", In Proceedings of IEEE International Conference on Automation Science and Engineering, Aug. 17, 2013, pp. 617-622.

"Second Written Opinion Issued in PCT Application No. PCT/US2015/014020", dated Dec. 3, 2015, 5 Pages.

Ruffieux, et al., "Polarization Sensitive Diffuser", In Proceedings of the International Society for Optics and Photonics, vol. 6992, Dec. 31, 2008.

Rebaudengo, et al., "Soft-Error Detection Through Software Fault-Tolerance Techniques", In Proceedings of the 14th International Symposium on Defect and Fault-Tolerance in VLSI Systems, Nov. 1999, 9 pages.

SAS; "ETL Performance Tuning Tips", Published on: Jan. 2, 2007, Available at: http://support.sas.com/resources/papers/ETLperformance07.pdf.

Pouzet, et al., "Translation Validation for Synchronous Data-Flow Equations in a Lustre Compiler", Retrieved on: Aug. 21, 2013, Available at: http://www.di.ens.fr/~pouzet/stages/sujetvalidation.pdf.

Bell, Jon, "Software Testing for Non-Testable Programs", Published on: Jan. 28, 2013, at: Available at: http://www.psl.cs.columbia.edu/64/metamorphic-testing/.

Adrion, et al., "Validation, Verification, and Testing of Computer Software", In Journal of ACM Computing Surveys, vol. 14, Issue 2, Jun. 1982, 34 pages.

"International Preliminary Report on Patentability Issued in PCT Application No. PCT/US2015/014020", dated Mar. 9, 2016, 6 Pages.

* cited by examiner

Mobile Computing Device

END TO END VALIDATION OF DATA TRANSFORMATION ACCURACY

BACKGROUND

Software users rely on accurate data to perform many different types of operations and tasks. For example, users may rely on the data to be accurate when creating tables, charts, reports, and the like. When users do not trust the accuracy or validity of the data (e.g., non-trusted data) they may: be hesitant in using the data; dispute results based on the data; or may even refuse to use the data. Before the data is received by the user, the data may flow through a data pipeline that includes different nodes that perform transformations on the data. For example, one node in the pipeline may extract a portion of the data from a large data stream, another node in the pipeline may format the data, and another node may store the data. Sometimes, however, the data may become corrupted or change during a transformation. Detecting changes to the data while it is flowing through the data pipeline can be difficult. For example, in some situations an error may not be detected if a failure does not occur at one of the transformation nodes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Data is validated as it travels through the different nodes of a data pipeline. Instead of having to wait to validate the data when the data reaches an end of the data pipeline, each node in the pipeline may validate the data. For example, each node in the data pipeline may determine that the data it receives is data that it expects to receive as well as determining if the node transforms the data accurately. Different methods may be used to determine if the data is valid. For example, each node may determine metadata about the received data and/or the transformed data that is then used in determining whether or not the data is valid.

When data is received at a node in the pipeline, the metadata that is determined may include characteristics such as: a size of the data, a number of columns in the data, a number of rows in the data, a type or types of the data, timing information of the data through the nodes and pipeline, and the like. This metadata may be used to determine if the node is receiving the same amount of data as it usually receives, whether the data is in a same format, and the like. For example, if a node receives 50 columns of data and 100 rows of data when the node typically receives 100 columns and 100 rows of data, then the node may determine that the received data is not valid. Similarly, if the metadata that is associated with the transformed data from the node is not similar to the metadata of previously transformed data, then the transformed data may be determined to not be valid.

A timing of the data through one or more of the nodes may also be used in determining when the data is valid. For example, if the time it takes the data to move through the pipeline is longer or shorter than is typical, a problem with the validity of the data may be detected. When a problem is detected at any of the nodes in the pipeline, a report may be sent to one or more users that indicates the validity of the data through the nodes in one or more data pipelines.

DETAILED DESCRIPTION

Figure 1:
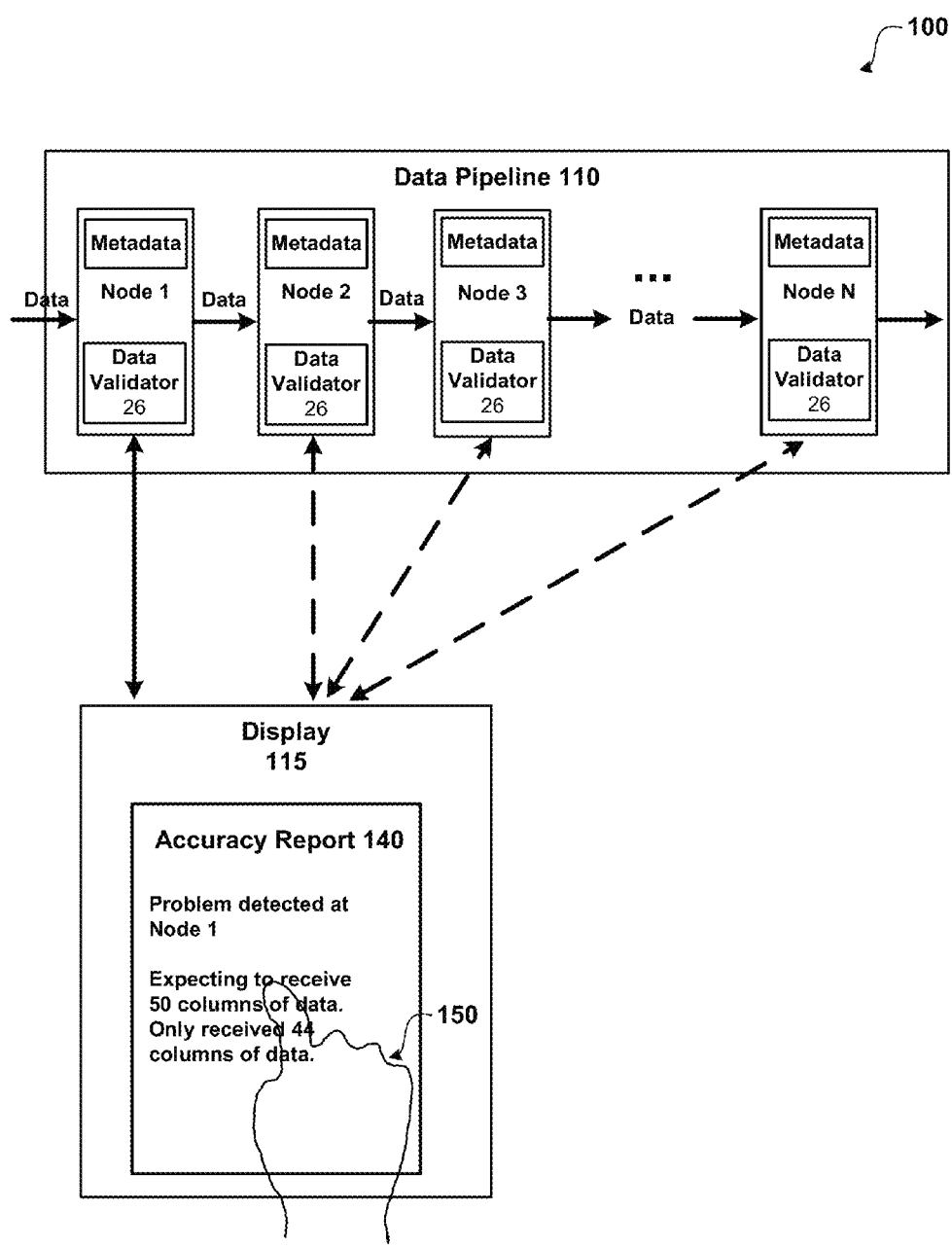
FIG. 1 shows an overview of a system for end to end validation of data transformation in a data pipeline.

Software users generally trust that the data that they use in performing operations is accurate and valid ("trusted data"). These users trust that the data has not been corrupted, that the data is complete (e.g., not missing any data or having additional data) and that the data is current. For example, users of a financial software system may rely on the fact that the data they use in creating financial reports is accurate and current. In some cases, however, this financial data may become corrupted before it reaches the user or the data may be "stale."

In the current financial example, financial data may flow through different nodes in a data pipeline that each performs different transformations on the data. For example, a first node may receive raw financial data from a financial data source and extract a portion of the financial data from the raw financial data. A second node in the pipeline may transform the financial data by formatting the extracted financial data. A third node may transform the data by performing calculations using the extracted and formatted financial data and a fourth node may store the transformed data in a spreadsheet. Any of these nodes may detect when there is a problem with the data or may experience a problem that creates invalid data. For example, a node may not receive data it expects from another node or the node may corrupt the data when performing a transformation of the data. Instead of having to wait to validate the data when the data reaches an end of the data pipeline (e.g., stored in the spreadsheet . . . ), each node in the pipeline is configured to validate the data. For example, each node in the financial data pipeline determines that the financial data it receives is similar to previously received financial data and that the data that leaves the node after being transformed is similar to previously transformed data. Different methods may be used by the nodes to validate the data. For example, each node may determine metadata (e.g., a size of the data, a number of columns in the data, a number of rows in the data, a type or types of the data, a time the data was received . . . ) for the received data and for the transformed data. This metadata is then used to validate the data by comparing the currently determined metadata against previously determined metadata. For example, any one of the nodes in the financial data stream may determine that the size of the data that it received is not the same size as it usually receives. Whenever a node determines that the data is not valid, a report may be sent to one or more users.

Referring now to the drawings, in which like numerals represent like elements, various embodiment will be described elements.

FIG. 1 shows an overview of a system for end to end validation of data transformation in a data pipeline. As illustrated, system 100 includes data pipeline 110, nodes 1-N that each include data validator 26 and display 115. While a data validator 26 is shown as part of each node, one or more data validators may be shared between nodes. For example, each node may use the same data validator, some nodes may use their own data validator, some nodes may share a data validator, and the like.

As briefly discussed, instead of having to wait to validate data until the data reaches an end of a data pipeline, such as data pipeline 110, each node in the pipeline (e.g., nodes 1-N) may validate the data using data validator 26 as it receives and processes the data.

Each data validator 26 determines when data flowing through the node in the data pipeline is valid. For example, data validator 26 may be used to determine that the data it receives is consistent with the data it expects to receive as well as determine that any transformations that a node performs are accurate. Different methods may be used by data validator 26 to validate the data. For example, each node may determine metadata about the received data and/or the transformed data. Initially, a node in the data pipeline may not know a size or type of the data that it is going to receive until the node actually receives the data a first time. For example, node 2 may not know the size of the data it is typically to receive from node 1 before node 2 actually receives data from node 1. In this way, the nodes in a data pipeline may be used to determine the validity of the data as it moves through the data pipeline without being hard-coded to interact with and process a specific type of data.

When data is received at a node in the pipeline, data validator 26 determines metadata about the received data. The metadata that is determined may include various characteristics of the data such as: a size of the data (e.g., a memory size), a number of columns in the data, a number of rows in the data, a type or types of the data, time information relating to the data, and the like. Generally, the metadata that is determined from the data includes one or more quantifiable characteristics that describe the data.

Data validator 26 uses the determined metadata to determine if the node is receiving the same amount of data as it usually receives (or within some predetermined variance), whether the data is in a same format, and the like. According to an embodiment, each node stores the current metadata that is determined along with previous metadata that is determined Data validator 26 compares the currently determined metadata for the received data to the previously determined metadata to determine if the received data is similar to or matches previously received data. For example, if node 2 in data pipeline 110 receives 1 MB of data from node 1 when it typically receives 1.3 MB of data, then node 2 may determine that the received data is not valid after comparing the metadata determined from the currently received metadata from previously determined metadata.

Data validator 26 may also be used to determine if the node transforms the received data accurately. According to an embodiment, data validator 26 determines and stores metadata that is determined from currently transformed data along with storing metadata that is determined from previous transforms performed by the node. Data validator 26 compares the currently determined metadata relating to the different transformations with the previously determined metadata to determine if the transformed data is similar to or matches previously transformed data to determine if the transformed data is valid. For example, if node 2 transforms the received data to include four columns of data and the output from the transformation includes fewer columns, then node 2 may determine that the transformation of the received data is invalid based on the comparison of the metadata.

Data validator 26 may also be used to determine a problem relating to the timing of the data through one or more of the nodes. For example, when node 2 does not receive data from node 1 for two minutes, but typically receives data every minute from node 1, data validator 26 may determine that there is a potential problem with the received data. Similarly, if node 1 transforms the data either more quickly than normal or slower than normal, then data validator 26 may determine a problem with the data.

When a problem is detected at any of the nodes in the pipeline, a report may be sent to one or more users. In the current example, data validator 26 that is associated with node 1 sent accuracy report 140 that is displayed on display 115. The dotted lines from nodes 2-N indicate that any of the nodes may create and send a report to display 115.

The report may be sent to one or more users, such as an administrator that includes information that relates to the detected problem at one or more nodes. In the current example, accuracy report 140 shows that a problem is detected at node 1. Accuracy report 140 shows that node 1 expected to receive 50 columns of data but that node 1 only received 44 columns of data. In the current example, user 150 is selecting the report to receive more detailed information relating to the validity of the data through the node and the data pipeline (See FIGURES and related discussion below). More details regarding determining the validity of data transformations are provided below.

Figure 2:
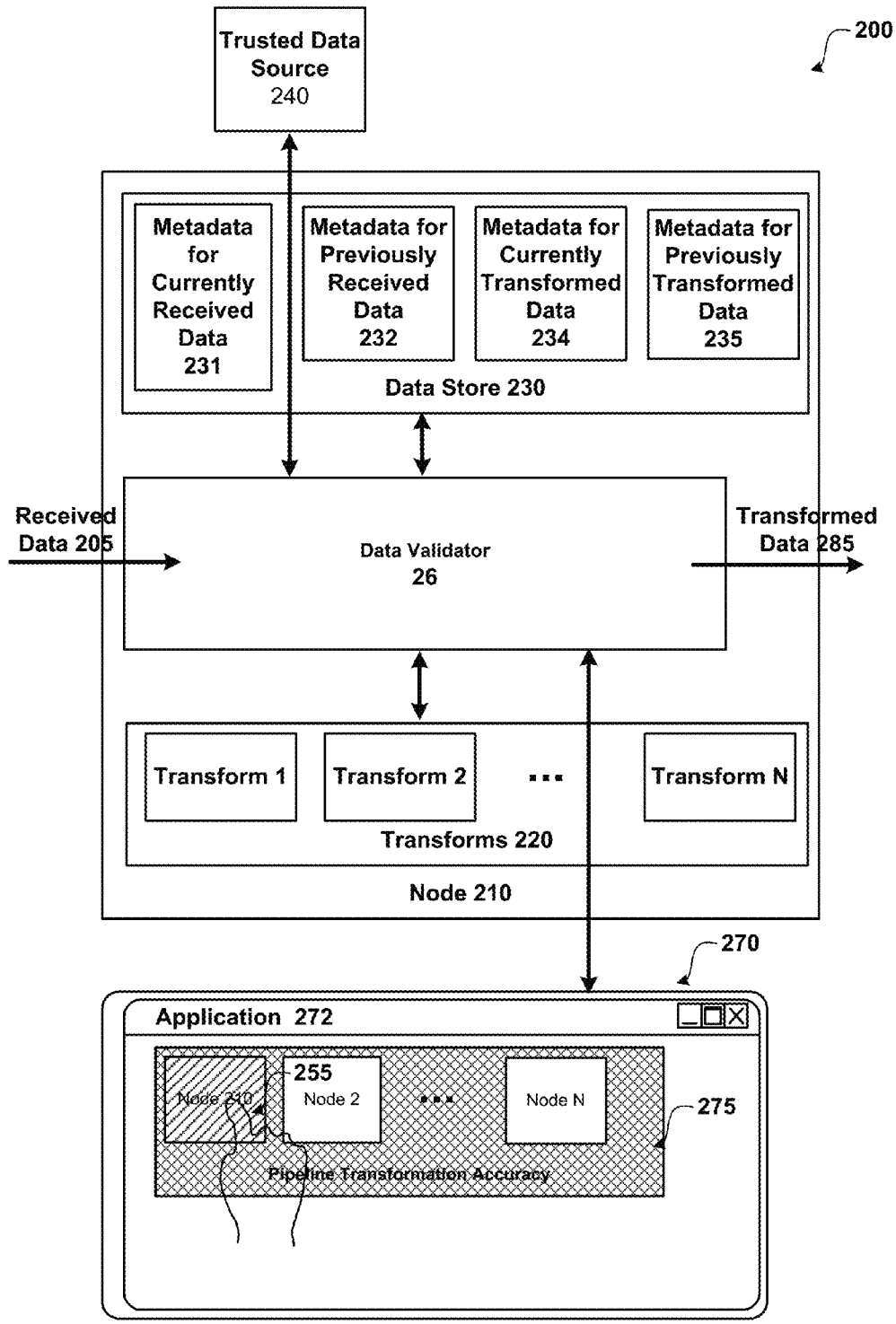
FIG. 2 shows a view of a node including a data validator used in determining a validity of data that is flowing through a data pipeline.

FIG. 2 shows a view of a node including a data validator used in determining a validity of data that is flowing through a data pipeline.

As illustrated, system 200 includes trusted data source 240, application 272, computing device 270 and node 210 that includes data validator 26, data store 230 and transforms 220.

Data validator 26 is configured to send a report (e.g. report 275) in response to different conditions that relate to the validity of received data 205 or transformed data 285. For example, data validator 26 may send report 275 automatically in response to detecting that received data 205 is invalid or that transformed data 285 is invalid. Data validator 26 may also send report 275 at predetermined times or manually in response to a request for a report. According to an embodiment, a report is automatically sent when invalid data is detected by a node within the data pipeline.

As illustrated, report 275 that is displayed on computing device 270 displays information that relates to the overall operation of nodes within the pipeline. Other types of reports may be created and displayed. For example, the report may include more specific information about the data at the particular node.

As illustrated in report 275, the nodes and the pipeline health are displayed using different formatting depending on the pipeline transformation accuracy that is associated with each node and the pipeline. In the current example, node 210 is shown within report 275 using one fill pattern, nodes 2-N are shown without a fill pattern, and the overall pipeline transformation accuracy is shown in yet another fill pattern. The graphical representation of the nodes and the pipeline is directed at allowing a user receiving the report to more easily identify and locate the nodes experiencing a detected transformation problem. In the current example, the fill pattern shown in node 210 of report 275 indicates that data validator 26 determined that data flowing through the node is determined to be invalid. The absence of a fill pattern in nodes 2-N indicates that no validity problem with the data has been detected. The fill pattern shown for the overall pipeline indicates that a validity problem of the data has been detected with at least one of the nodes in the pipeline. Many other methods of formatting the graphical elements in the report may be used. For example, different colors may be used to indicate a seriousness of the detected validity problem, border thicknesses may be changed, formatting of text may be changed, animations may be presented, and the like.

Data store 230 is configured to store metadata relating to the data that flows through one or more nodes of the data pipeline. According to an embodiment, each node stores metadata that is determined from the data that is received by the node and metadata that is determined from data that is transformed by the node. As illustrated, node 210 includes metadata for currently received data 231, metadata for previously received data 232, metadata for currently transformed data 234 and metadata for previously transformed data 235.

Metadata for currently received data 231 is metadata that is determined from received data 205. As discussed, the metadata that is determined for the currently received data 205 may include different types of information and characteristics of the data. For example, metadata for currently received data 231 may include information such as: a size of received data 205, a time the received data 205 is received, a number of columns in received data 205, a number of rows in received data 205, a type or types of data included in received data 205, and the like.

Metadata for previously received data 232 is metadata that was previously determined from received data 205. Metadata for previously received data 232 may include metadata from one or more previous metadata determinations. For example, metadata for previously received data 232 may include average values from previously determined metadata. The metadata for previously received data 232 may be updated at various times. For example, the metadata may be updated after comparing the metadata for currently received data with the metadata for the previously received data, or at some other time.

Metadata for currently transformed data 234 is metadata that is determined from transformed data 285. As discussed, the metadata that is determined for the currently transformed data 285 may include different types of information and characteristics of the data.

Metadata for previously transformed data 235 is metadata that was previously determined from transformed data. Metadata for previously transformed data 235 may include metadata from one or more previous metadata determinations.

According to an embodiment, an authorized user may configure the information that is stored in data store 230. For example, data store 230 may also include configuration information relating to determining the metadata, determining when to send a report, and the like. According to another embodiment, the metadata may be stored at some other location, such as a memory, a network store, and the like.

A node, such as node 210, may apply zero or more transforms (e.g., transforms 1-N) to received data 205. Many different transforms may be applied to the data. For example, the transform may format the data, extract data, add data, perform calculations to the data, package the data, store the data, as well as perform other operations involving the received data. Generally, a transform may be any operation that involves the received data. As illustrated, transforms 220 stores the transforms that are applied to the received data 205. While transforms 220 is illustrated within node 210, transforms 220 may be stored at a different location (e.g., a network data store or some other location).

Trusted data source 240 includes data that is determined to be "trusted data." As used herein, "trusted data" refers to data that has been processed and transformed using predefined rules and regulations. According to an embodiment, data validator 26 may use data and/or metadata from trusted data source to determine when received data 205 or transformed data 285 is valid. Trusted data is discussed in more detail with regard to FIG. 3.

Figure 3:
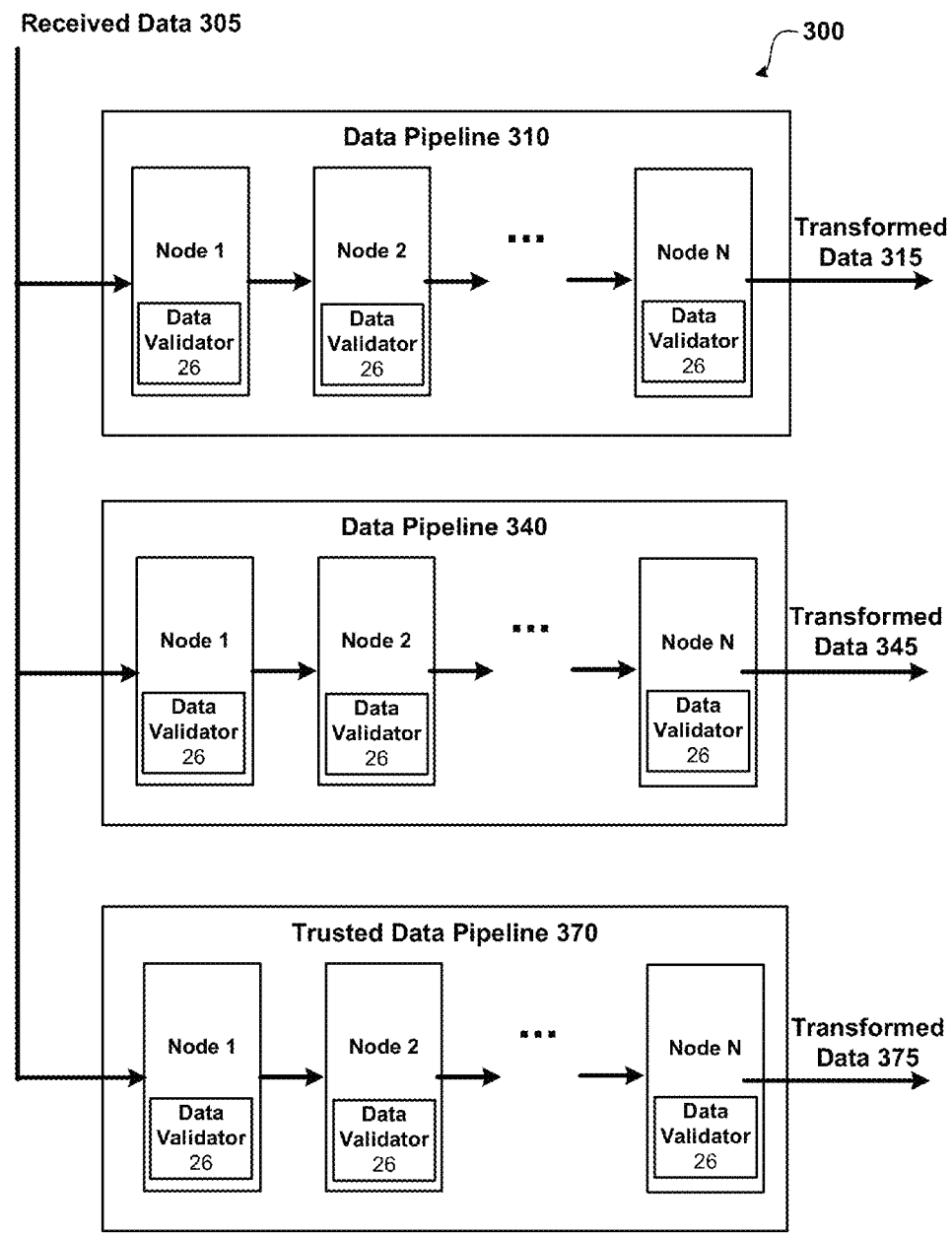
FIG. 3 shows example pipelines including a trusted data pipeline that includes end to end validation of data transformations.

FIG. 3 shows example pipelines including a trusted data pipeline that includes end to end validation of data transformations.

As illustrated, system 300 shows data pipeline 310, data pipeline 340, and trusted data pipeline 370. Data may flow through fewer or more data pipelines than illustrated. For example, a single data pipeline may be used or multiple data pipelines may be used by a software application or service.

System 300 includes a trusted data pipeline 370 that is configured to provide "trusted data." For example, trusted data pipeline 370 may include more data processing regulations as compared to data pipeline 310 and 340 for processing and transforming the data. There are many different ways of helping to ensure that data is trusted data as well as ways of establishing a trusted data pipeline. In many situations, however, processing received data (e.g., received data 305) through trusted data pipeline 370 may take longer than processing received data 305 through other data pipelines, such as data pipeline 310 and data pipeline 340 that do not follow the same regulations and rules for processing the data. Generally, trusted data pipeline 370 attempts to ensure that transformed data 375 is: complete data, current data, consistent data, clean data, compliant data, and collaborative data. Complete data refers to transformed data 375 that represents the "truth" for the system. Current data refers to data that is not "stale" data. For example, some data may become "stale" after a predetermined period of time. Processing this stale data may result in inaccurate data. Consistent data refers to processing and transforming the received data consistently using the same definitions across one or more systems. Clean data refers to data that is processed and transformed using high quality methods relating to standardization of the data, verification of the data, and the like. Compliant data refers to data that follows applicable compliance regulations. Collaborative data refers to data that may be shared. Transformed data 375 may be considered the "truth" of the data of the system.

One or more of the data validators 26 that are illustrated in data pipeline 310 and data pipeline 340 may use trusted data that is obtained from trusted pipeline 370. For example, a node in data pipeline 310 or data pipeline 340 may use metadata that is obtained from the same node in trusted data pipeline 370 instead of (or in addition to) when comparing the metadata for either or both of the received data at a node or the transformed data at a node. According to an embodiment, an authorized user may configure when to use trusted data. According to another embodiment, trusted data is used in response to a request from an authorized user.

Figure 4:
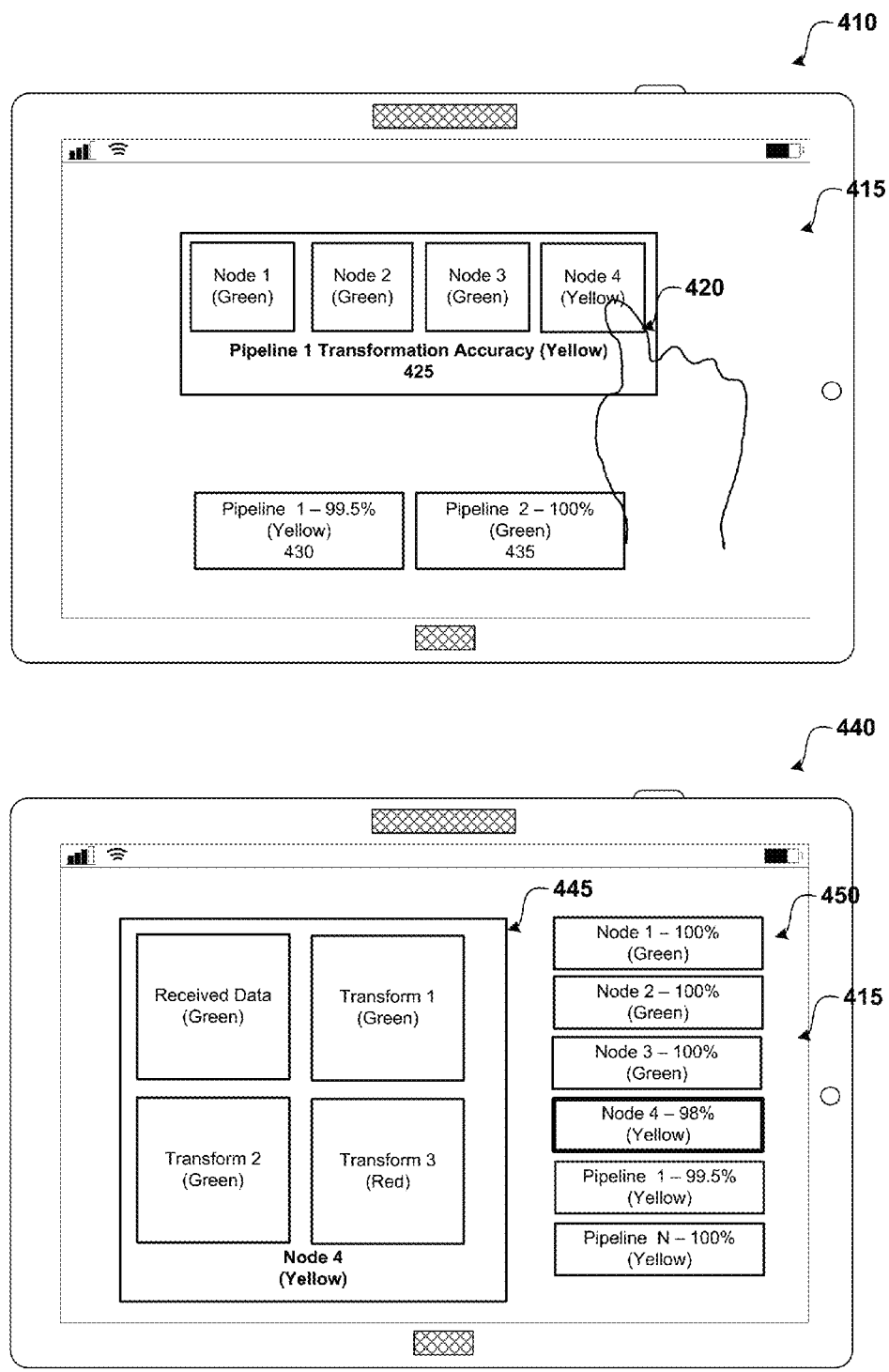
FIG. 4 shows example Graphical User Interfaces (GUIs) for viewing and configuring preferences that are associated with end to end validation of data in a data pipeline.

FIG. 4 shows example Graphical User Interfaces (GUIs) for viewing and interacting with reports relating to end to end validation of data in a data pipeline. The GUIs shown in FIG. 4 are for illustrative purposes and are not intended to be limiting.

Display 410 includes an exemplary GUI that shows a report 415 of pipeline transformation accuracy. As illustrated, pipeline 1 user interface element 425 indicates the accuracy of pipeline 1 as well as an indication of each node's accuracy that is within pipeline 1. According to an embodiment, different colors are used to indicate the accuracy of each node and the pipeline. For example, coloring a representation of a node or a pipeline: green indicates that the node or pipeline is operating normally; yellow indicates that a potential validity problem with the data may exist; and red indicates more serious validity problems. Different colors and/or formatting options may be used to provide an indication of the validity of the data.

Below the display of pipeline user interface element 425 is an overview display for each pipeline that provides an indication on how each pipeline is performing. As illustrated, pipeline 1 element 430 includes a numerical indicator (99.5%) as well as color indicator (yellow) to show the accuracy of pipeline 1. Pipeline 2 element 435 includes a numerical indicator (100%) as well as color indicator (green) to show the accuracy of pipeline 2. A user may view report 415 and quickly notice how a pipeline is performing. According to an embodiment, the user interface elements (e.g., node elements and pipeline elements) are selectable by a user. When selected, more detailed information is provided to the user. As illustrated in display 410, user 420 is selecting the node 4 element to obtain a more detailed view of node 4. In response to receiving a selection the node 4 element, a more detailed view of node 4 is shown as illustrated in display 440.

Display 440 is an exemplary display showing a more detailed view of a node, such as node 4. As illustrated, the node 4 element 445 includes an element that shows the determined accuracy for the received data and each transform that the node performs. In the current example, the received data, transform 1 and transform 2 are operating without a detected validity problem and are colored green. The element for transform 3, however, is colored red to show a detected validity problem for the transform 3 operation.

Display 440 also includes an overview display 450 showing each node in the current pipeline being viewed along with an overview of each pipeline's accuracy. In the current example, the user interface element for node 4 is formatted differently (e.g., thicker border) from the other elements to indicate that the node 4 element is currently being viewed in display element 445. According to an embodiment, a user may select one or more of the displayed elements to obtain a more detailed view of the node or pipeline. For example, when a user selects the node 2 element, display 445 would be updated to display the details for node 2.

Figure 5:
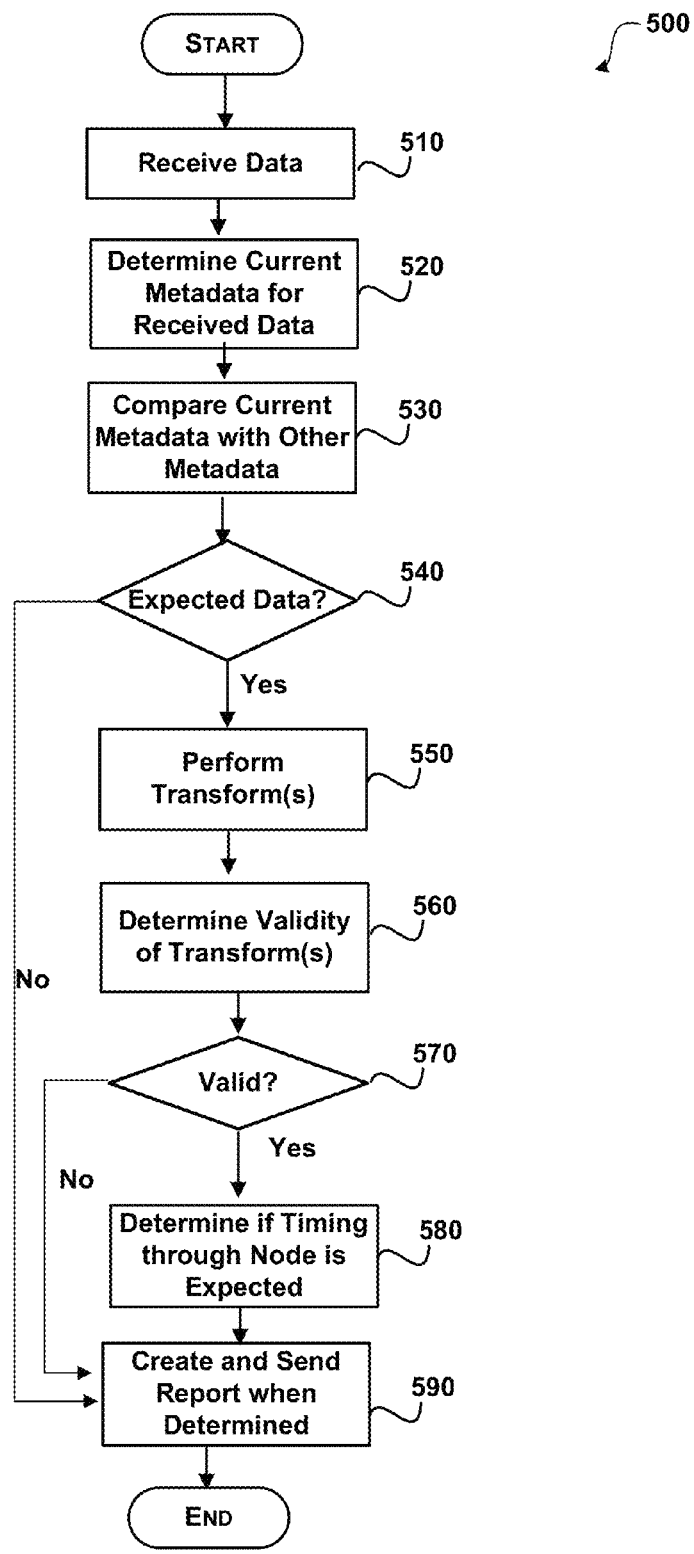
FIG. 5 illustrates a process for performing end to end validation of data through a data pipeline.
Figure 6:
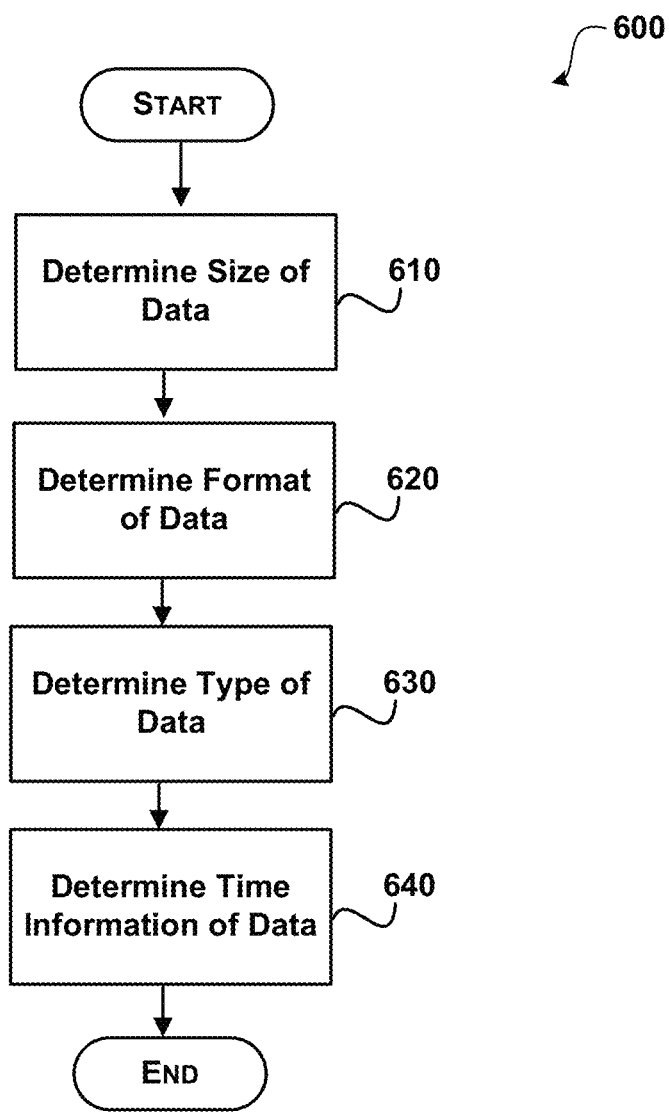
FIG. 6 illustrates a process for determining metadata used in end to end validation of data through a data pipeline.

FIGS. 5 and 6 illustrate processes for end to end validation of data transformation accuracy. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 5 illustrates a process 500 for performing end to end validation of data through a data pipeline.

After a start operation, the process moves to operation 510, where data is received. The data may be received by any node in a data pipeline. For example, the data may be received by the first node in the data pipeline or the last node in the data pipeline. The data may be many types of data. For example, the data may be numerical data, textual data, and the like. Further, the data may be structured data or unstructured data. For example, the data may be arranged in columns, rows, tables, and the like.

Flowing to operation 520, metadata for the received data is determined. The metadata that is determined includes characteristics that assist in describing the data. For example, the metadata that is determined may include various characteristics of the data such as: a size of the data, a number of columns in the data, a number of rows in the data, a type or types of the data, timing information for the data, and the like.

Transitioning to operation 530, a comparison is made to determine if the received data is expected data. According to an embodiment, a comparison is made between the currently determined metadata for the received data to the previously determined metadata about received data to determine if the received data is similar to or matches previously received data. For example, if 200 K of integers that is arranged in three columns is received and 300 K of integers in three columns is expected, then the received data is not expected data. According to another embodiment, the comparison may be made between the currently determined metadata for the received data and metadata that is determined using trusted data.

Moving to decision operation 540, a decision is made as to whether the received data is expected data. When the received data is expected data (e.g., based on the comparison of the metadata), then the process flows to operation 550. When the received data is not expected data, the process flows to operation 590.

At operation 550, transforms are performed by the node. As discussed, a node may apply zero or more transforms to data. Many different types of transforms may be performed. For example, a transform may: format the data, extract data, add data, perform calculations to the data, package the data, store the data, as well as perform other operations involving the received data.

Flowing to operation 560, a validity of the transform(s) is determined. According to an embodiment, metadata for the transformed data is determined and compared to previously determined metadata for previously transformed data. According to another embodiment, a comparison is made between the currently determined metadata for the transformed data and metadata that is determined using trusted data.

Moving to decision operation 570, a determination is made as to whether the transformed data is valid. When the comparison between the different metadata indicates a difference between the current metadata and the other metadata, then a transform is determined to not be valid and the process flows to operation 590. When the comparison does not indicate a validity problem, the process flows to operation 580.

Flowing to operation 580, a determination is made as to whether the timing of the data through one or more of the nodes is expected. For example, if the time it takes the data to move through the pipeline is longer or shorter than is typical, a problem with the validity of the data may be detected. Similarly, if a node does not receive data within some expected window of time, the node may determine that the data is "stale" and detect a validity problem with the data.

Moving to operation 590, a report is created and sent when determined. The report may be sent to one or more users, such as an administrator that includes information that relates to the detected problem at one or more nodes. A report may be sent automatically or manually. For example, a report may be automatically sent in response to detecting a validity problem with received data or transformed data. A report may also be sent at predetermined times or manually in response to a request for a report.

Different types of information may be included in the report. For example, the report may include textual description that relates to the validity of the data as well as a graphical representation of the nodes and the pipeline. According to an embodiment, the report includes selectable graphical elements that each indicate how a node or pipeline is performing. Nodes or pipelines that have a detected validity problem are shown differently (e.g., color, fill pattern, formatting) as compared to nodes or pipelines that do not have a detected validity problem.

The process then flows to an end operation and returns to processing other actions.

FIG. 6 illustrates a process 600 for determining metadata used in end to end validation of data through a data pipeline. The different metadata that is determined is for exemplary purposes and is not intended to be limiting. For example, more or less metadata may be determined by a data validator.

After a start operation, the process moves to operation 610, where a size of the data is determined. The size may be an overall size of the data (e.g., 100 K of data), a number of total items received (e.g., 5000 numbers received), a number of rows received, a number of columns received, and the like.

Flowing to operation 620, a format of the data is determined. For example, the format may be a single column, multiple columns, a single row, multiple rows, a table, and the like. According to an embodiment, the format that is determined includes a number of rows and columns of the data.

Transitioning to operation 630, a type of the data is determined. The data may be one or more types. For example, the data may be integers, floating point numbers, textual characters, or other types of data.

Flowing to operation 640, time information of the data is determined. According to an embodiment, the time information includes a time the data is received or transformed. The time information may also include other information such as: a total time spent in a node, a time period since last receiving data, and the like.

The process then flows to an end operation and returns to processing other actions.

Figure 7:
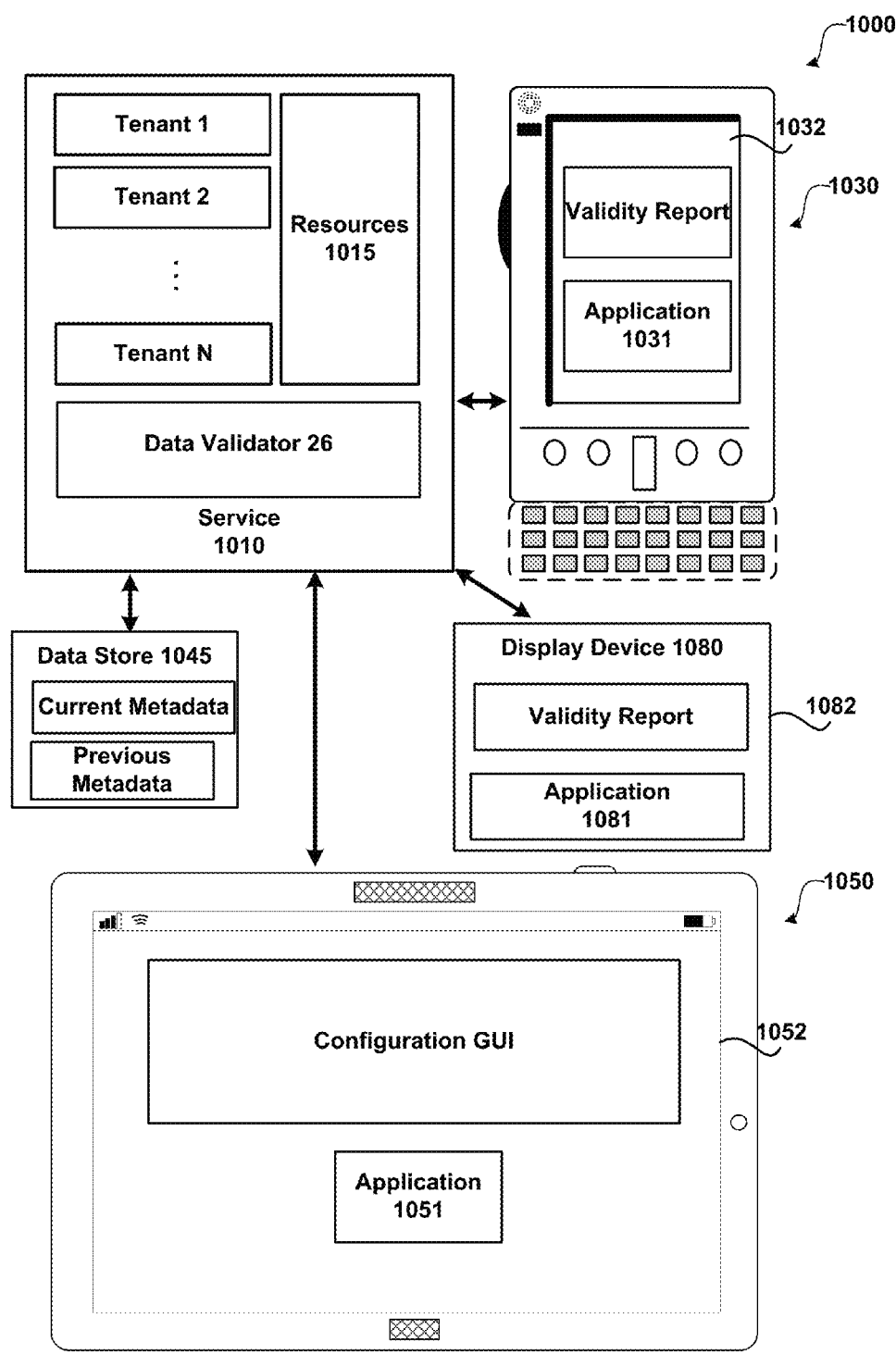
FIG. 7 illustrates an exemplary online system that includes end to end validation of data transformation.

FIG. 7 illustrates an exemplary online system that includes end to end validation of data. As illustrated, system 1000 includes service 1010, data store 1045, and touch screen input device 1050 (e.g. a slate), smart phone 1030 and display device 1080.

Service 1010 is a cloud based and/or enterprise based service that may be configured to provide services, such as messaging services and productivity services (e.g. spreadsheets, documents, presentations, charts, messages, and the like). The service may be interacted with using different types of input/output. For example, a user may use speech input, touch input, hardware based input, and the like. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, and inductive sensors.

According to an embodiment, smart phone 1030, touch screen input device 1050, and device 1080 each include an application (1031, 1051, 1081).

As illustrated, touch screen input device 1050, smart phone 1030, and display device 1080 shows exemplary displays 1052/1032/1082 showing the use of an application and a display relating to end to end validity of data. Data may be stored on a device (e.g. smart phone 1030, slate 1050 and/or at some other location (e.g. network data store 1045). Data store 1045, or some other store, may be used to store current metadata, previous metadata, trusted data, as well as other data. The applications used by the devices may be client based applications, server based applications, and cloud based applications and/or some combination. According to an embodiment, display device 1080 is a device such as a MICROSOFT XBOX coupled to a display.

Data validator 26 is configured to perform operations relating to end to end data validation as described herein. While data validator 26 is shown within service 1010, the functionality of the data validator 26 may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
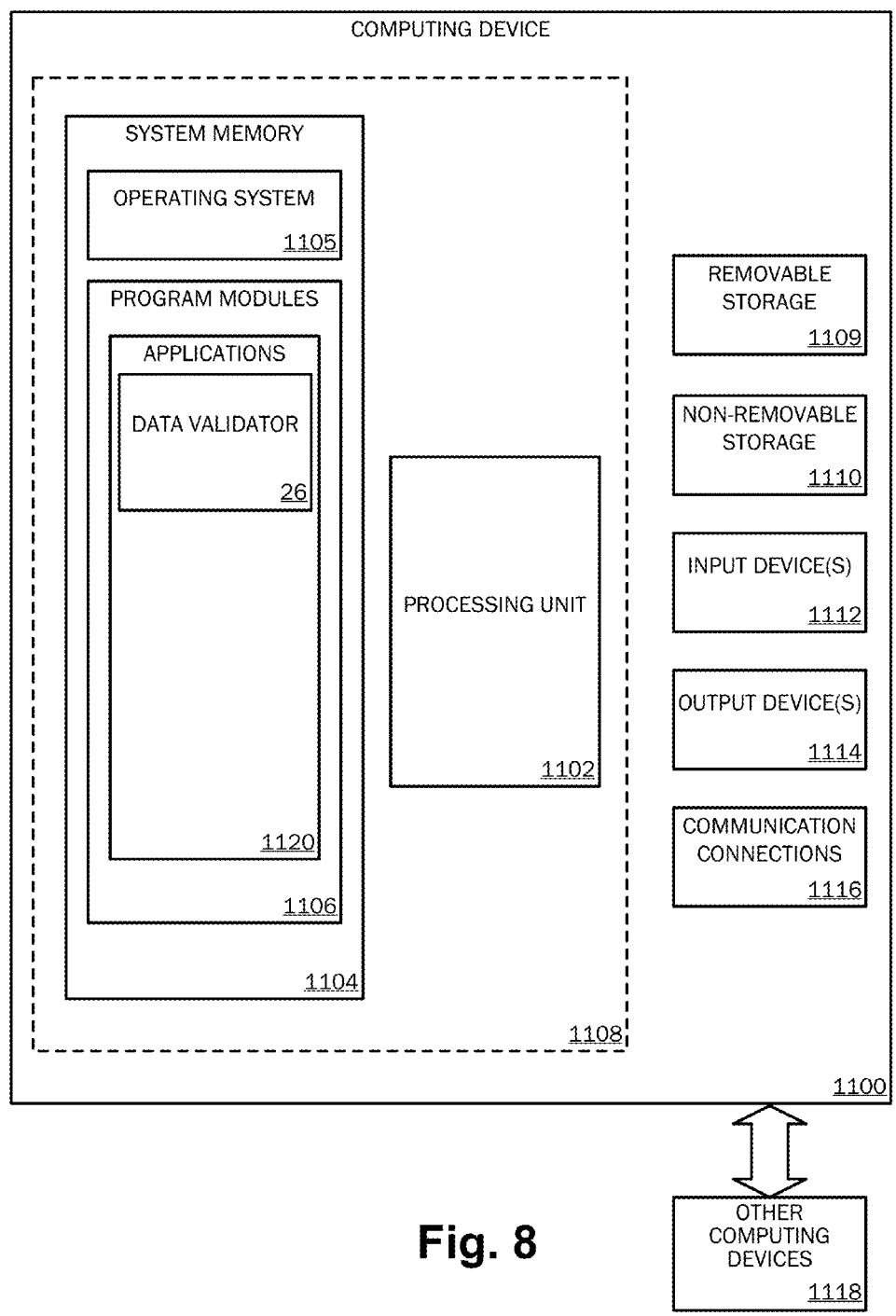
FIGS. 8, 9A, 9B and 10 and the associated descriptions provide a discussion of a variety of operating environments in which embodiments of the invention may be practiced.
Figure 9A:
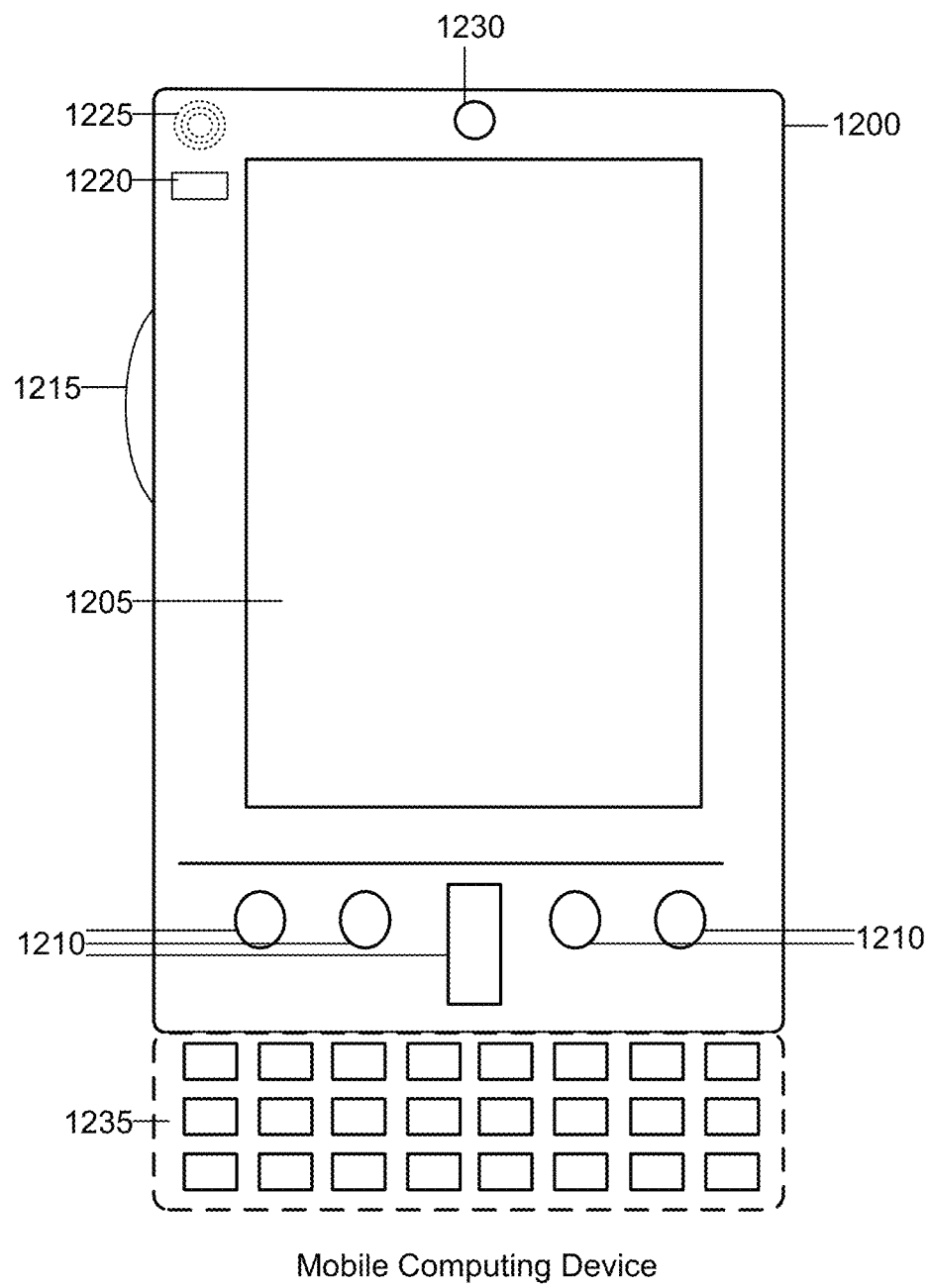
Figure 9B:
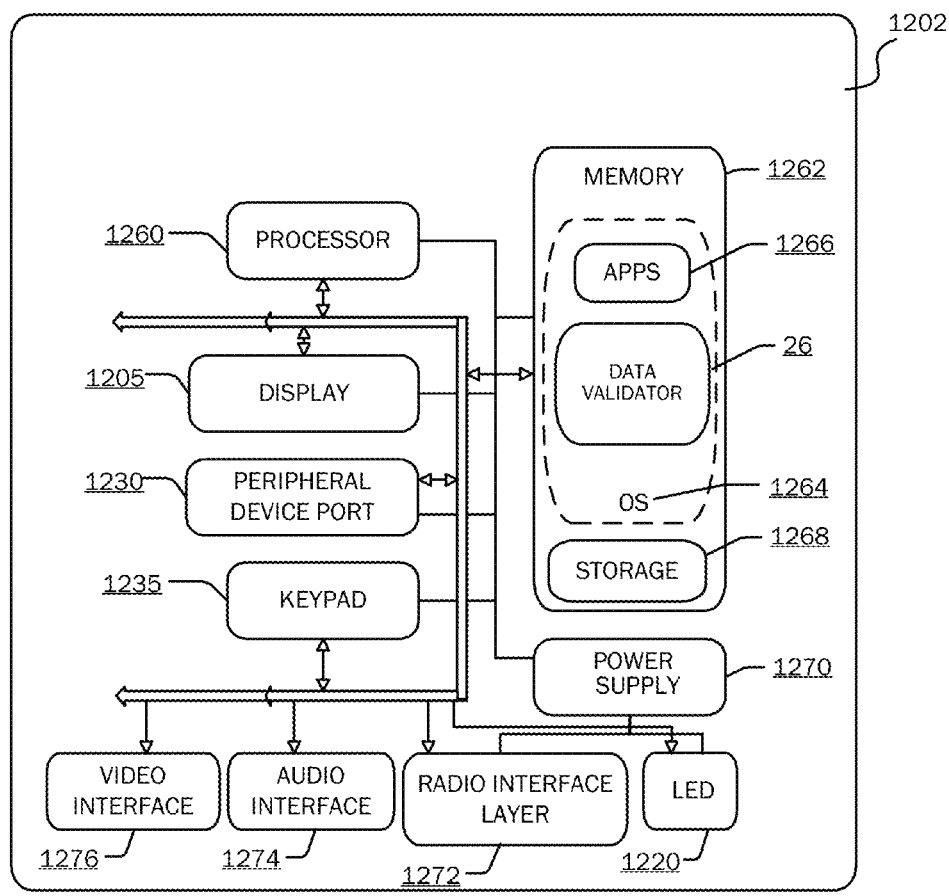
Figure 10:
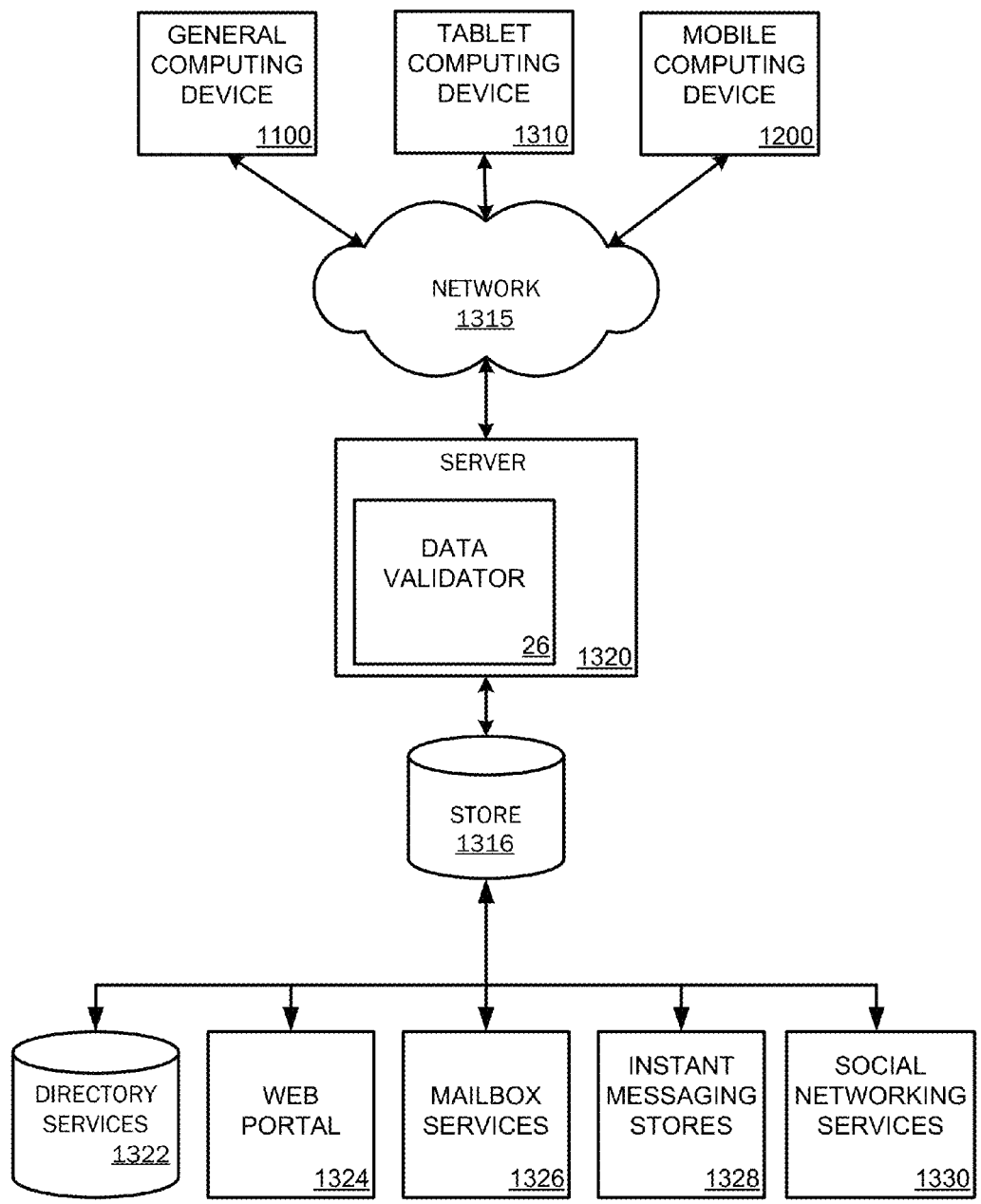

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the data validator 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 8 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 8 by a removable storage device 1109 and a non-removable storage device 1110.

As stated above, a number of program modules and data files may be stored in the system memory 1104. While executing on the processing unit 1102, the program modules 1106 (e.g., the data validator 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the data validator 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 1200, for example, a mobile telephone, a smart phone, a tablet personal computer, a laptop computer, and the like, with which embodiments of the invention may be practiced. With reference to FIG. 9A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the data validator 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 9B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 10 illustrates an embodiment of an architecture of an exemplary system, as described above. Content developed, interacted with, or edited in association with the data validator 26 may be stored in different communication channels or other storage types. For example, various documents may be stored using a directory service 1322, a web portal 1324, a mailbox service 1326, an instant messaging store 1328, or a social networking site 1330. The data validator 26 may use any of these types of systems or the like for enabling data utilization, as described herein. A server 1320 may provide the data validator 26 to clients. As one example, the server 1320 may be a web server providing the data validator 26 over the web. The server 1320 may provide the data validator 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for validating data at a node in a data pipeline that includes a plurality of nodes, comprising:

receiving data at the node;

determining metadata for the received data, the metadata including characteristics about the received data;

comparing the metadata to previously determined metadata about previous data received at the node to determine whether the received data is expected;

determining, based on a transformed version of the received data at the node, transformation metadata, the transformation metadata being characteristics about the transformed version of the received data at the node;

comparing the transformation metadata to previously determined transformation metadata about data previously transformed by the node to determine if the transformed version of the received data is valid;

and providing a report in a case where the transformed version of the received data is invalid.

2. The method of claim 1, further comprising transforming the received data at the node to the transformed version of the received data.

3. The method of claim 1, wherein determining the transformation metadata includes determining the characteristics about the transformed version of the received data.

4. The method of claim 1, wherein the received data is received from a trusted data source.

5. The method of claim 1, wherein determining the metadata further comprises determining at least one of: a number of rows of the data, a number of columns of the data, or a memory size of the received data.

6. The method of claim 1, further comprising determining a timing of the data through the node.

7. The method of claim 1, further comprising storing the transformation metadata.

8. The method of claim 1, further comprising providing the report to include a graphical representation of each node in the data pipeline and a graphical representation of the data pipeline and including a graphical indication for each of the graphical representations that represent a validity of the associated node or graphical pipeline.

9. A computer-readable storage medium storing computer-executable instructions validating data at a node in a data pipeline, comprising:

receiving data at the node;

determining metadata for the received data, the metadata including characteristics about the received data;

comparing the metadata to previously determined metadata about previous data received at the node to determine whether the received data is expected;

determining, based on a transformed version of the received data at the node, transformation metadata, the transformation metadata being characteristics about the transformed version of the received data at the node;

comparing the transformation metadata to previously determined transformation metadata about data previously transformed by the node to determine if the transformed version of the received data is valid;

providing a report in a case where the transformed version of the received data is invalid.

10. The computer-readable storage medium of claim 9, wherein the metadata is determined from the received data by the node.

11. The computer-readable storage medium of claim 9, further comprising determining whether a timing of data through the node is expected.

12. The computer-readable storage medium of claim 9, wherein the received data is received from a trusted data source.

13. The computer-readable storage medium of claim 9, wherein the determining of the metadata data further comprises determining at least one of: a size of the data; a number of rows of the data; and a number of columns of the data.

14. The computer-readable storage medium of claim 9, further comprising determining a timing of the data through the node to determine if the transformed version of the received data is valid.

15. The computer-readable storage medium of claim 9, further comprising storing the transformation metadata.

16. The computer-readable storage medium of claim 9, further comprising providing the report to include a graphical representation of each node in the data pipeline.

17. A system for validating data at a node in a data pipeline, comprising:
   a processor and memory;
   an operating environment executing using the processor; and
   a data validator that is configured to perform actions comprising:
      receiving data at the node;
      determining metadata for the received data, the metadata including characteristics about the received data;
      comparing the metadata to previously determined metadata about previous data received at the node to determine whether the received data is expected;
      determining, based on a transformed version of the received data at the node, transformation metadata, the transformation metadata being characteristics about the transformed version of the received data at the node;
      comparing the transformation metadata to previously determined transformation metadata about data previously transformed by the node to determine if the transformed version of the received data is valid; and
      providing a report in a case where the transformed version of the received data is invalid.

18. The system of claim 17, wherein determining the metadata further comprises determining at least one of: a size of the data; a number of rows of the data; and a number of columns of the received data.

19. The system of claim 17, further comprising determining a timing of the data through the node and using the timing to determine if the transformed version of the received data is valid.

* * * * *